(12) United States Patent
Soryal et al.

(10) Patent No.: US 12,299,820 B2
(45) Date of Patent: May 13, 2025

(54) METHOD AND SYSTEM FOR PROVIDING SYNTHETIC EMERGENCY SCENE RECONSTRUCTION

(71) Applicant: AT&T Intellectual Property I, L.P., Atlanta, GA (US)

(72) Inventors: Joseph Soryal, Glendale, NY (US); Howard Lang, Wayside, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 208 days.

(21) Appl. No.: 18/066,538

(22) Filed: Dec. 15, 2022

(65) Prior Publication Data
US 2024/0127542 A1    Apr. 18, 2024

Related U.S. Application Data

(60) Provisional application No. 63/417,064, filed on Oct. 18, 2022.

(51) Int. Cl.
| | |
|---|---|
| *G06T 19/00* | (2011.01) |
| *G06F 16/9537* | (2019.01) |
| *G06F 40/20* | (2020.01) |
| *G06T 13/00* | (2011.01) |
| *H04W 4/029* | (2018.01) |
| *H04W 4/90* | (2018.01) |

(52) U.S. Cl.
CPC .......... *G06T 19/00* (2013.01); *G06F 16/9537* (2019.01); *G06F 40/20* (2020.01); *G06T 13/00* (2013.01); *H04W 4/029* (2018.02); *H04W 4/90* (2018.02)

(58) Field of Classification Search
None
See application file for complete search history.

(56) References Cited

U.S. PATENT DOCUMENTS

| | | | | |
|---|---|---|---|---|
| 9,794,755 | B1 * | 10/2017 | South | .................. H04W 4/021 |
| 11,093,814 | B2 * | 8/2021 | Oyenan | ................ H04M 3/5116 |

(Continued)

OTHER PUBLICATIONS

Apple, "How to use Emergency SOS via satellite on iPhone 14." YouTube, by Apple Support, Sep. 7, 2022, www.youtube.com/watch?v=V35jHAkpUlk (Year: 2022).*

(Continued)

*Primary Examiner* — Yu Chen
(74) *Attorney, Agent, or Firm* — Guntin & Gust, PLC; Miyoung Shin

(57) ABSTRACT

Aspects of the subject disclosure may include, for example analyzing emergency communications that were transmitted from end user devices; determining that a group of the emergency communications that corresponds to a group of the end user devices is associated with an emergency event; extracting descriptions of the emergency event from the group of the emergency communications; retrieving mapping data of a location associated with the emergency event; and generating a graphical representation of the emergency event based on a machine learning model being applied to the mapping data and the descriptions, where the machine learning model is trained on historical emergency events. Other embodiments are disclosed.

20 Claims, 8 Drawing Sheets

(56) References Cited

U.S. PATENT DOCUMENTS

| | | | |
|---|---|---|---|
| 11,790,766 B2* | 10/2023 | Martin | G08B 21/10 |
| | | | 701/31.4 |
| 2020/0329340 A1* | 10/2020 | Rahman | H04B 17/382 |
| 2021/0229292 A1* | 7/2021 | Liu | G06T 7/0004 |
| 2023/0169836 A1* | 6/2023 | Brandfass | G08B 25/007 |
| | | | 348/152 |

OTHER PUBLICATIONS

Pix4D. "Drones, Public Safety & Emergency Response: 5 Use Cases." Pix4D, Aug. 13, 2019, www.pix4d.com/blog/emergency-response-drone-mapping/.) (Year: 2019).*

* cited by examiner

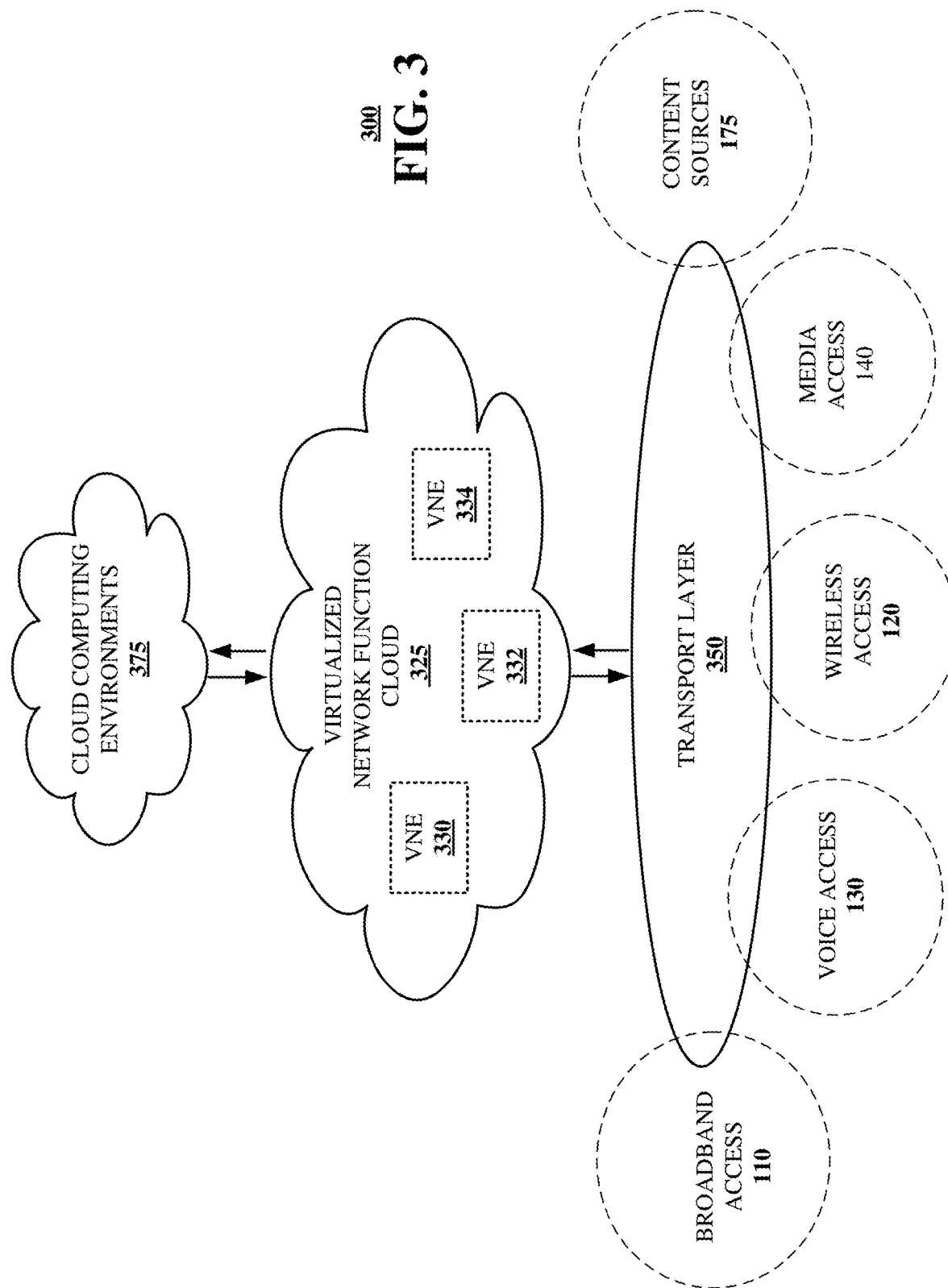

METHOD AND SYSTEM FOR PROVIDING SYNTHETIC EMERGENCY SCENE RECONSTRUCTION

CROSS REFERENCE TO RELATED APPLICATIONS

This application claims priority to U.S. Provisional Patent Application Ser. No. 63/417,064 filed on Oct. 18, 2022. All sections of the aforementioned application are incorporated herein by reference in their entirety.

FIELD OF THE DISCLOSURE

The subject disclosure relates to a method and system for providing synthetic emergency scene reconstruction.

BACKGROUND

Emergency events necessitate accurate information that is timely provided, particularly to emergency responders that are on the scene. An emergency responder network exists, such as FirstNet, to facilitate communication with and between emergency responders on the scene.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein.

DETAILED DESCRIPTION

Figure 1:
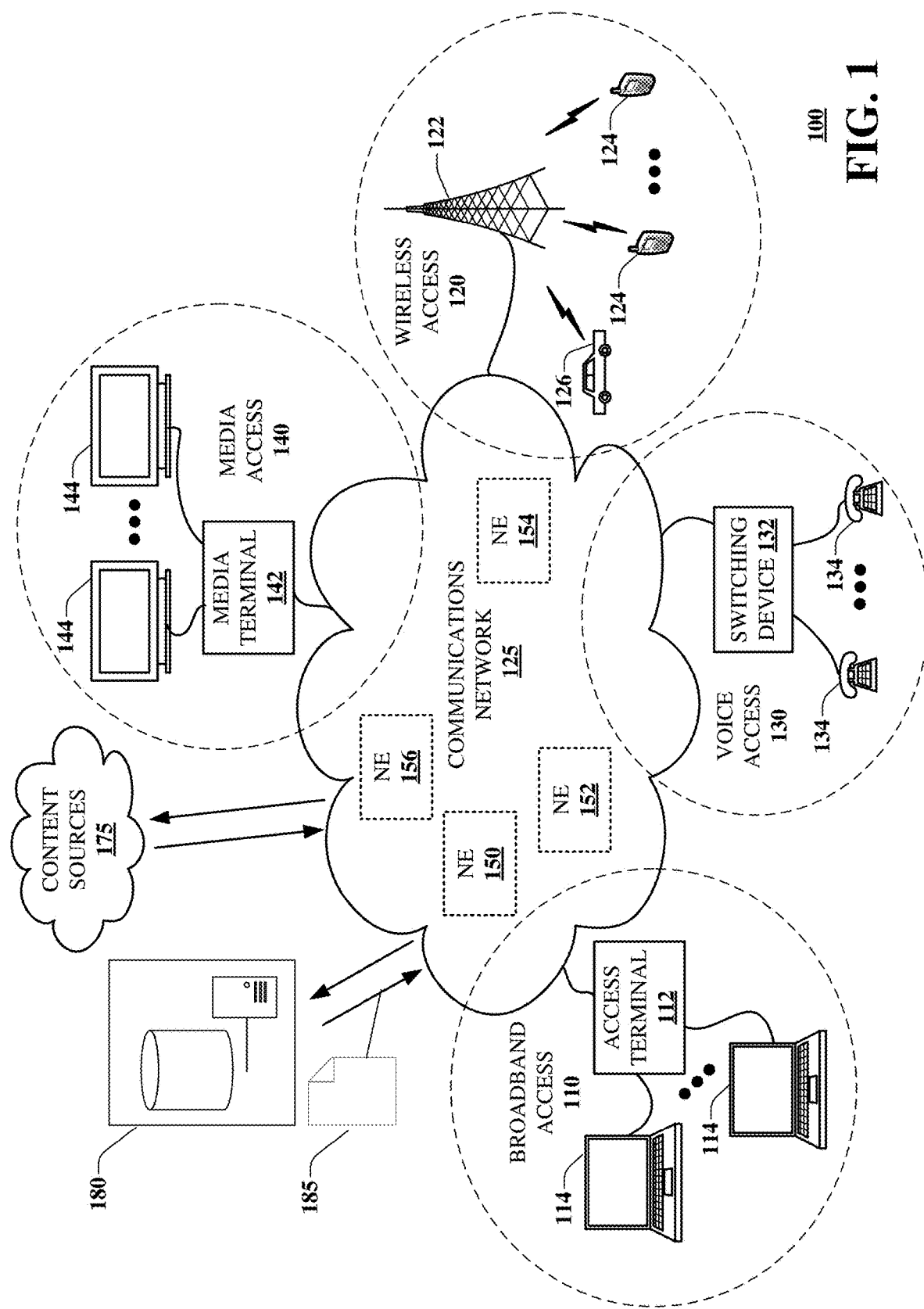
FIG. 1 is a block diagram illustrating an exemplary, non-limiting embodiment of a communications network in accordance with various aspects described herein.

The subject disclosure describes, among other things, illustrative embodiments for an Emergency Scene Synthesis (ESS) engine can be provided that can consume or otherwise analyze various information associated with an emergency event, including emergency communications describing the emergency event (e.g., 911 calls, satellite SOS messages, CBRS communications, and so forth). The ESS engine can operate in a centralized fashion or in a distributed fashion. The ESS engine can be resident at various devices, including Emergency Services network, Core network, edge server, and so forth. In one embodiment, the ESS engine can generate a graphic representation of the emergency event which can be a still graphic, moving images, animation, and so forth, so as to visually represent what is happening at the emergency event. In one embodiment, the graphic representation of the emergency event can include historical, current and/or future data or descriptions of the emergency event, such as in a fire showing progress of the fire from where it began to where it currently is to where it is predicted to go. This same past, present, and/or future descriptions can be applied to other emergency events, such as a crime in progress, a tornado, and so forth.

In one embodiment, the ESS engine can generate the graphic representation of the emergency event to include particular objects (of interest) which can be live objects, moving objects, inanimate objects, and so forth, such as: a location of a suspect and victims in a building; a layout of a building with fire extinguishers, stairs and trapped persons; a map indicating location of forest fire, fire fighters, and fire engines. As described herein, these objects can also be depicted or otherwise described based on past, present, and/or future descriptions, such as indicating an outer extent of a forest fire one hour ago, indicating a current extent of the forest fire and indicating a predicted outer extent of the forest fire one hour in the future. In one embodiment, the ESS engine can generate the graphic representation of the emergency event utilizing Artificial Intelligence/Machine Learning (AI/ML). In one embodiment, the ESS engine can generate the graphic representation of the emergency event by obtaining mapping data. In one embodiment, the ESS engine can generate the graphic representation of the emergency event by obtaining various other information, including news reporting, publicly available documents, and so forth. Other embodiments are described in the subject disclosure.

One or more aspects of the subject disclosure include a device, comprising: a processing system including a processor; and a memory that stores executable instructions that, when executed by the processing system, facilitate performance of operations, the operations comprising: analyzing emergency communications that were transmitted from end user devices; querying a location information server to determine a location that is common to a group of the end user devices; determining that a group of the emergency communications that corresponds to the group of the end user devices is associated with a particular emergency event; extracting descriptions of the particular emergency event from the group of the emergency communications; retrieving mapping data of the location; and generating a graphical representation of the particular emergency event according to the mapping data and the descriptions.

One or more aspects of the subject disclosure include a method comprising: analyzing, by a processing system including a processor of a network device, a first emergency communication that was transmitted from a first end user device over a Citizens Broad Band Radio Service (CBRS) spectrum via a CBRS access point of a private network, the first emergency communication being associated with an emergency event; providing, by the processing system, a query to the CBRS access point to obtain information regarding the private network including a number of second end user devices attached to the private network and a signal strength for each of the second end user devices; determining, by the processing system, locations for each of the second end user devices; extracting, by the processing system, a description of the emergency event from the first emergency communication; retrieving, by the processing system, mapping data for a location of the emergency event; and generating, by the processing system, a graphical representation of the emergency event according to the mapping data, the description and the locations for each of the second end user devices.

One or more aspects of the subject disclosure include a non-transitory machine-readable medium, comprising executable instructions that, when executed by a processing system including a processor, facilitate performance of operations, the operations comprising: analyzing emergency communications that were transmitted from end user devices; determining that a group of the emergency communications that corresponds to a group of the end user devices is associated with an emergency event; extracting descriptions of the emergency event from the group of the emergency communications; retrieving mapping data of a location associated with the emergency event; and generating a graphical representation of the emergency event based on a machine learning model being applied to the mapping data and the descriptions, wherein the machine learning model is trained on historical emergency events.

Referring now to FIG. 1, a block diagram is shown illustrating an example, non-limiting embodiment of a system 100 in accordance with various aspects described herein. System 100 can include a server(s) 180 or other computing resource(s) (e.g., virtual machine(s)) that can generate a graphical representation 185 or scene reconstruction associated with an emergency event. In one embodiment, the server 180 can execute the ESS engine to perform scene reconstruction in various scenarios including crime scenes (ongoing such as where a suspect is on the run or completed), disasters, accidents, and so forth. In one embodiment, the ESS engine can obtain information from various sources including emergency calls, satellite SOS messages, FirstNet communications (or other emergency responder networks), CBRS communications, private network communications, and so forth.

For example, system 100 can facilitate in whole or in part analyzing emergency communications that were transmitted from end user devices; determining that a group of the emergency communications that corresponds to a group of the end user devices is associated with an emergency event; extracting descriptions of the emergency event from the group of the emergency communications; retrieving mapping data of a location associated with the emergency event; and generating a graphical representation of the emergency event based on a machine learning model being applied to the mapping data and the descriptions, where the machine learning model is trained on historical emergency events.

In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
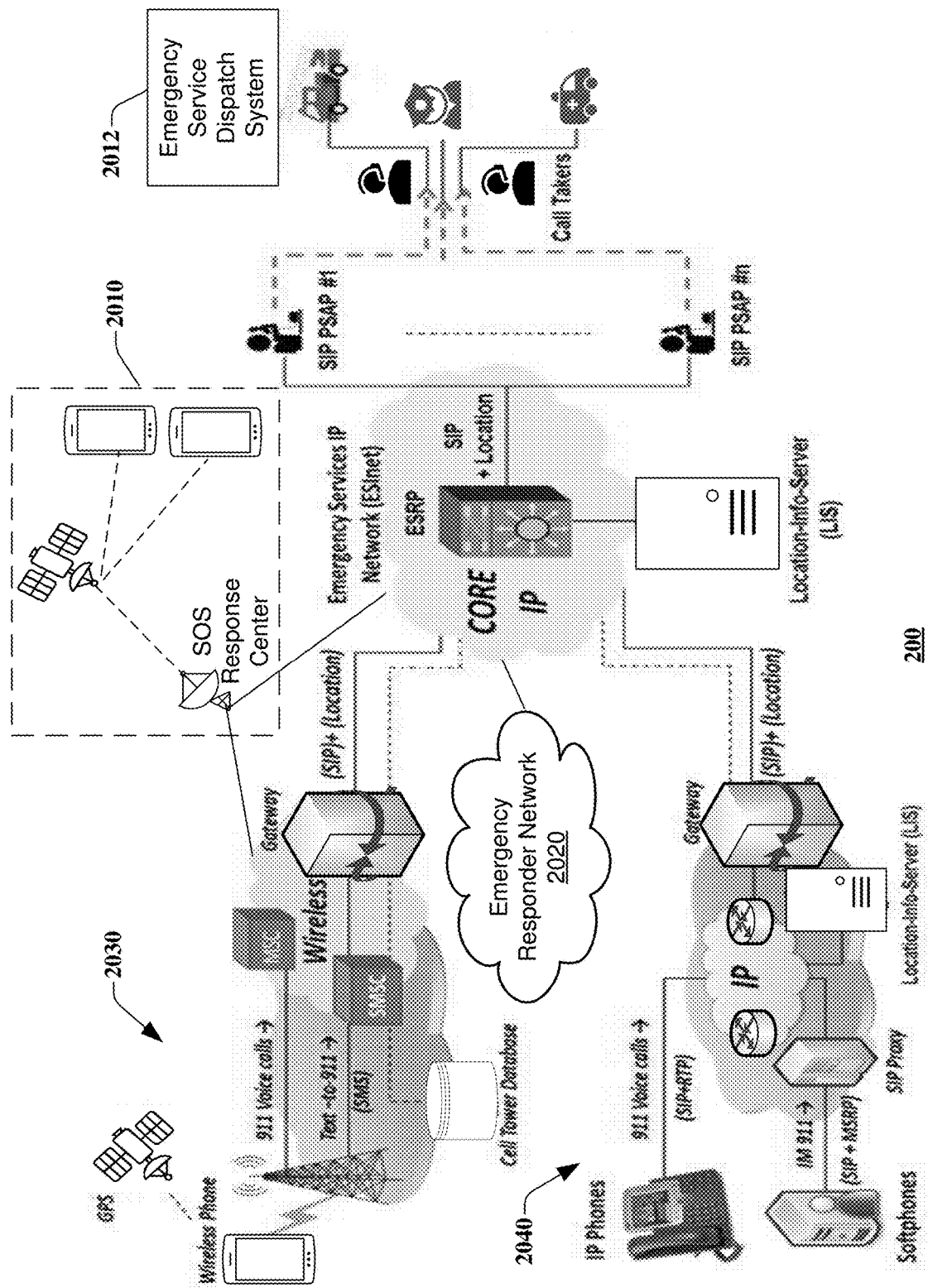
FIG. 2A is a block diagram illustrating an example, non-limiting embodiment of a system functioning within the communication network of FIG. 1 in accordance with various aspects described herein.

FIG. 2A is a block diagram illustrating an example, non-limiting embodiment of a system 200 functioning within the communication network of FIG. 1 in accordance with various aspects described herein. System 200 can include computing resources (e.g., server or virtual machine(s) located at various locations including the Emergency Services Network) that can execute the ESS engine and can generate a graphical representation or scene reconstruction associated with an emergency event. In one embodiment, the ESS engine performs scene reconstruction in various scenarios including crime scenes (ongoing or completed), disasters, accidents, and so forth. In one embodiment, the ESS engine can obtain information from various sources including one or more of emergency calls from wireless network 2030, satellite SOS messages from SOS response system 2010, FirstNet communications (or other emergency responder networks) from emergency responder network 2020, E911 calls from IP network 2040, emergency calls over PSTN, CBRS communications, private network communications, dispatch system 2012, and so forth.

In one embodiment, the ESS engine can be utilized to analyze emergency communications that have been determined to be valid communications associated with a particular event. In one embodiment, the ESS engine can analyze individual reports, and aggregate information in the reports to provide a comprehensive view of the event, including as the event is occurring. In one embodiment, the ESS engine can be a software application powered via AI/ML that resides at various locations such as in the emergency Service Network, which can monitor incoming emergency communications such as 911 calls. In one embodiment, the ESS engine can utilize a Location Information Server to detect that a number of the users are calling from a same place. In this example, once the ESS engine determines that these calls are related to the same incident, the ESS engine can convert the 911 reporting by each individual into a coherent description that is utilized to reconstruct the crime scene/incident/disaster/event. In one embodiment, the ESS engine can obtain a map feed (e.g., from a private or public database) and can incorporate other publicly available information (e.g., a news reporting), and will augment all this information to have a visual (e.g., synthetic image and/or video) for the incident(s).

In one embodiment, the ESS engine can communicate with a CBSD operating a CBRS network that a reporting end user device is connected to (e.g., via a query to the end user device) and can query the CB SD or device regarding the number of devices attached and the layout of the facility and/or terrain that the CBSD is installed in. Continuing with this example, the ESS engine will query the CBSD signal level and strength to get the exact situation and approximate locations of the callers and that can be augmented with GPS signals for location pinpointing. A similar technique can be applied to other private networks that may be operating on various spectrum which may or may not be CBRS.

In one embodiment, the ESS engine attempts to align views depicted from multiple emergency communications from multiple end user devices in order to create a video/animation or image of the event. In one embodiment, the ESS engine can utilize location information and timing information corresponding to the end user device and its corresponding emergency communication.

In one embodiment, the ESS engine can obtain a building layout from a government agency to facilitate generating the graphical representation. For instance, the layout can be inserted into the generated image or can be utilized as the background with detected/described objects being overlayed on the layout In one embodiment, the ESS engine can apply color coding as presence accuracy such as where a group of emergency communications asserts that three people are present in a building but another emergency communication asserts that it is four people. In this example, three people can be represented by green objects and a fourth person can be represented by a gray object until his or her presence is confirmed.

In one embodiment, the ESS engine can be used in conjunction with or based upon communications that go through an emergency responder network including communications between emergency responders that are on the scene.

In one embodiment, the ESS engine can show in real time a location of each emergency responder (e.g., according to GPS data of the responder's communication devices). In one embodiment, the ESS engine can search real estate websites for layouts of rooms, houses, and other property.

Figure 2B:
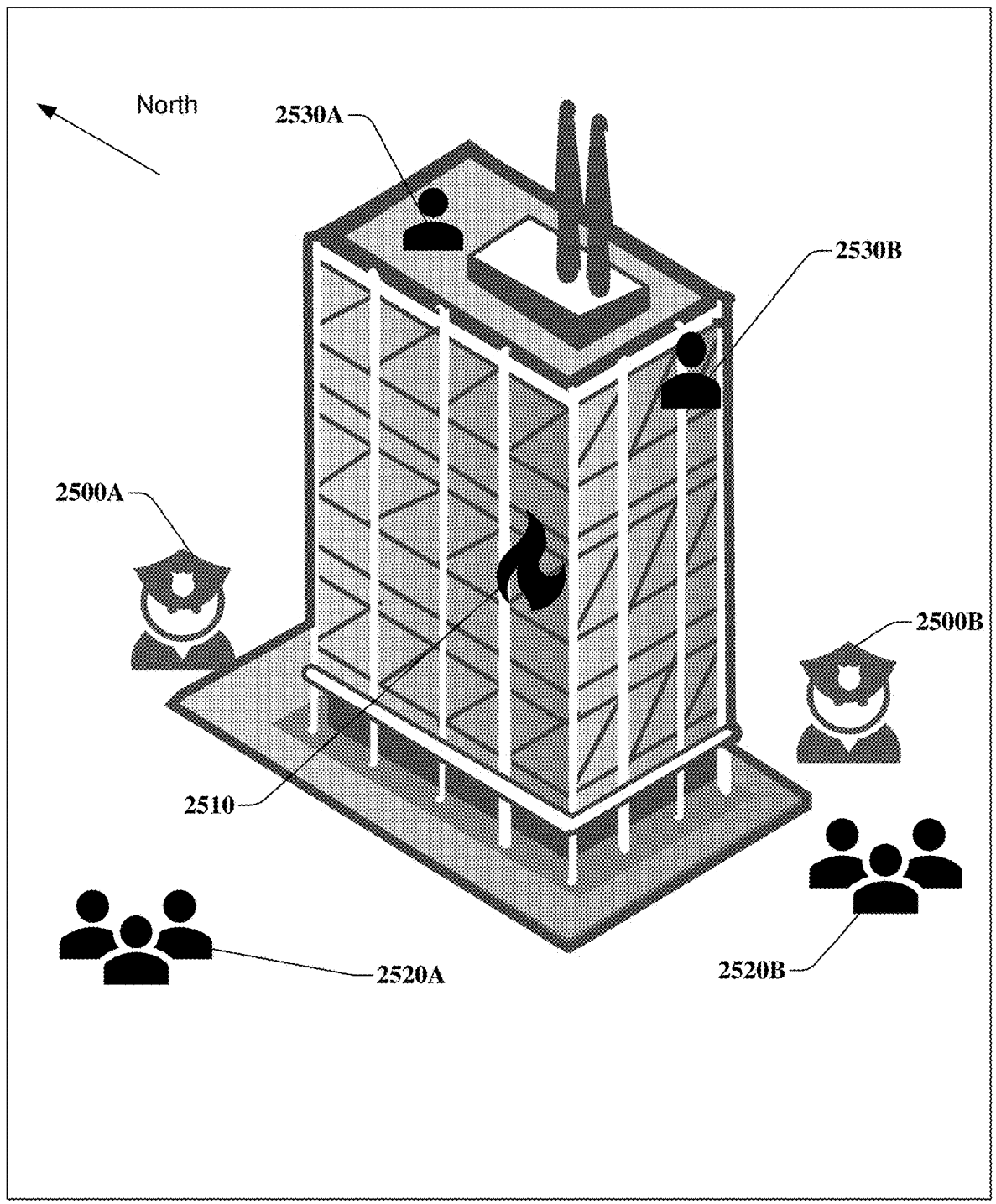
FIG. 2B is a block diagram illustrating an example, non-limiting embodiment of a graphical representation or graphical user interface that can be generated in accordance with various aspects described herein.

FIG. 2B is a block diagram illustrating an example, non-limiting embodiment of a graphical user interface 250 that can be generated in accordance with various aspects described herein. In this example, the emergency event is a fire 2510 in a building. The ESS engine can generate the graphical illustration 250 which can be a still image or a synthesized video that depicts various objects. As explained herein, the graphical illustration 250 can be generated based on various data including emergency communications from witnesses that can see the building; emergency communications from emergency responders at the scene; publicly available data regarding the building and the surrounding area, such as a building floorplan and layout from the permit department where the building is located; private information, such as a database of location information that the ESS engine can subscribe to and access; location services information for end user devices that may or may not have provided an emergency message or call; and so forth.

In this example, the graphical representation 250 depicts persons 2530A and 2530B on top of the building and on the highest floor of the building, respectively. The graphical representation 250 further depicts police officers 2500A and 2500B on the north and south sides of the buildings, as well as groups of people 2520A and 2520B on the west and south sides of the building. For instance, one or more of the persons 2520B made an emergency call describing the fire 2510, the person 2530B and the police officer 2500B, all of which were in their line of sight. Similarly, one or more of the persons 2520A made an emergency call describing the fire 2510, the person 2530A and the police officer 2500A, all of which were in their line of sight. The ESS engine aggregated the descriptions in these emergency calls to determine and graphically represent both police officers 2500A and 2500B, as well as both persons 2530A, 2530B. This aggregation of information can be applied at any scale including where numerous persons are in need of assistance in a large-scale disaster, such as a hurricane or earthquake. Additionally, this aggregation of information can be applied in real-time or near-real time to give accurate and timely graphical representations of the scene, which can include timely updates to the graphical representation 250, such as emergency call(s) that come in and describe person 2530B moving to the roof or emergency call(s) that come in and describe fire 2510 spreading to the highest floor. In this example, the graphical representation 250 can be a still image that is shown in 3D or in perspective. Other objects can be shown in the graphical illustration 250, such as stairwells, fire equipment in the building, and so forth.

As described herein, accuracy or confidence levels (e.g., color coding or scores) can be provided to the objects, such as based on determining the source of the information, determining corroboration of the information (e.g., corroboration by a number of emergency calls over a particular threshold), determining conflicting information with respect to an object (e.g., person 2530B being described on different floors), and so forth. In one embodiment, one or more end user devices of persons 2520A and 2520B can be provided with queries as to further information associated with the scene. As an example, the ESS engine can determine that it does not have any information from any end users on the east side of the building (e.g., an unaccounted-for region of the building). Continuing with this example, one or more end user devices of persons 2520B can be queried to determine if they have a view of the east side of the building and, if so, whether they see any persons inside of the building along the east side or on the roof along the east side. As another example, emergency responders, such as police officer 2500B can be notified of the unaccounted region of the building so that the police officer can obtain a view or otherwise investigate. As another example, the ESS engine can place an indicia on the graphical illustration 250 indicating the unaccounted for region of the building so that the police officer 2500B can look at the graphical representation and determine on his or her own to obtain a view of the east side of the building or otherwise investigate it.

In one embodiment, AI/ML can be utilized in generating some or all of the graphical representation 250. As an example, the graphical representation 250 can depict the emergency event at different time periods, including past, present and/or future time periods. For instance, the ESS engine can predict the fire will spread to the highest floor in ten minutes and can provide two still images where the first still image is the present time (as shown in FIG. 2B) and the second still image applies future predictions to various objects including showing the spread of the fire, and showing a new position of the person 2530B who is predicted to move north on the same floor. Time stamps can be utilized to distinguish the graphical representations 250. As explained herein, the AI/ML predictions can be based on various information, as well as various training of models. For instance, the AI/ML model can be trained based on previous fires in similar buildings. As another example, the AI/ML model can be trained on previous movements of persons inside of buildings when they saw or sensed a fire approaching them. The AI/ML can analyze other data, such as characteristics of the person 2530B to predict their movement, such as the person was an engineer or a former fire fighter and the prediction is that they will move as far from the fire as they can.

In one or more embodiments, the graphical representation 250 can utilize actual images that are overlaid by the detected or predicted objects. In one or more embodiments, the graphical representation 250 can be a video that utilizes synthesized images or real images (e.g., captured by bystanders, in a news feed, etc.).

Figure 2C:
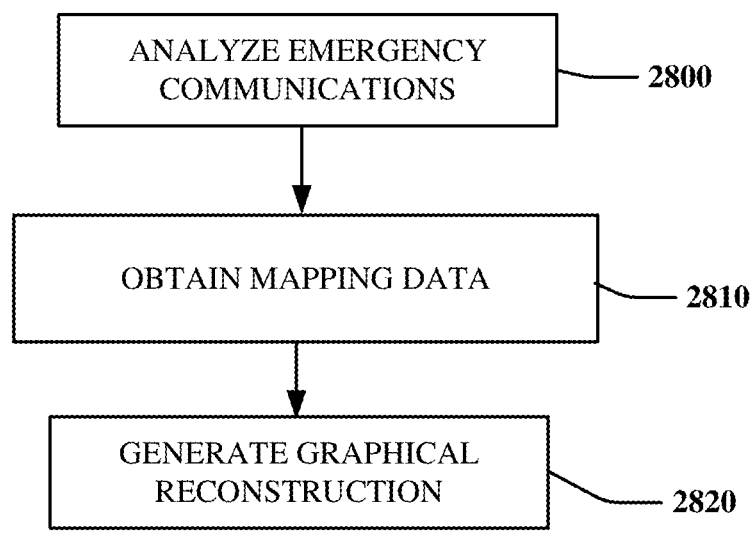
FIG. 2C depicts an illustrative embodiment of a method in accordance with various aspects described herein.

FIG. 2C depicts an illustrative embodiment of a method 280 in accordance with various aspects described herein. Method 280 can be performed by the ESS engine in whole or in part. At 2800, emergency communications can be analyzed that were transmitted from end user devices. In one embodiment, this can include determining a validity or legitimacy of the emergency communications. In one embodiment, this can include determining that a group of the emergency communications that corresponds to a group of the end user devices is associated with a same emergency event. At 2810, mapping data can be obtained or retrieved of a location associated with the emergency event. At 2820, a graphical representation can be generated of the emergency event. In one embodiment, this can include applying a machine learning model to mapping data and descriptions of the emergency event, where the machine learning model is trained on historical emergency events. In one embodiment, this can include extracting descriptions of the emergency event from the group of the emergency communications. In one embodiment, the generating the graphical representation of the emergency event comprises: determining objects present at the emergency event according to an aggregation of the descriptions of the emergency event from the group of the emergency communications; determining a confidence level for each of the objects; and providing the objects in the graphical representation of the emergency event according to the confidence level. The objects can be of various types including people, vehicles, structures, equipment, fire, flooding, buckled roads in an earthquake, and so forth.

As an example, confidence level or accuracy for an object can be evaluated and indicated in the graphical representation such as by color coding or confidence scores. For instance, an object representing a fire truck can be shown on a particular street and provided with a confidence score of 99% (or shown in green) based on GPS data from the fire truck, while an object representing an emergency responder can be shown on an adjacent street and provided with a confidence score of 70% (or shown in yellow) based on the emergency responder's location having come from two emergency communications of users that have made 911 calls, and further while an object representing a police officer can be shown on another adjacent street and provided with a confidence score of 50% (or shown in gray or red) based on the police officer's location having come from conflicting emergency communications of users that have made 911 calls but placed the police officer's location at different streets.

While for purposes of simplicity of explanation, the respective processes are shown and described as a series of blocks in FIG. 2C, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

In one embodiment, the mapping data can be of various types such as maps, images, layouts, descriptions of landmarks/structures, or anything else that can be utilized to indicate a landscape or representation of an area.

In one embodiment, a device includes a processing system including a processor; and a memory that stores executable instructions that, when executed by the processing system, facilitate performance of operations, the operations comprising: receiving, via a satellite, an emergency communication that was transmitted from an end user device to the satellite; providing a diligence request to the satellite that causes the satellite to request verification information from the end user device via an application programming interface with the end user device; receiving the verification information from the satellite; analyzing the verification information; and determining a legitimacy of the emergency communication according to the analyzing of the verification information.

In one embodiment, the end user device does not have terrestrial wireless communication services available, and the emergency communication is a text message. In one embodiment, the operations further comprise: characterizing the emergency communication as suspicious when the legitimacy of the emergency communication is determined to be below a threshold based on the analyzing of the verification information; and responsive to the suspicious characterization, adjusting a priority of the emergency communication to be lower than another priority of another emergency communication that has been characterized as non-suspicious for another emergency event.

In one embodiment, the verification information comprises an operating system version or update number.

In one embodiment, the determining the legitimacy of the emergency communication is based in part on analyzing a history of emergency communications associated with the end user device.

In one embodiment, the determining the legitimacy of the emergency communication is based in part on a location of the end user device, a location of an emergency event associated with the emergency communication, a number of other emergency communications from other end user devices that are associated with the emergency event, a time period of the other emergency communications, locations of the other end user devices, or a combination thereof.

In one embodiment, the operations further comprise: determining that the emergency communication corresponds to a particular emergency event; determining that the particular emergency event was already reported in one or more other emergency communications; and providing a feedback message to the satellite that causes the satellite to provide the feedback message to the end user device.

In one embodiment, the feedback message indicates that the particular emergency event has already been reported.

In one embodiment, the feedback message requests additional information regarding the particular emergency event.

In one embodiment, the operations further comprise: determining that the emergency communication corresponds to a particular emergency event; comparing a description of the particular emergency event in the emergency communication with a stored description of the particular emergency event generated from at least one or more other emergency communications corresponding to the particular emergency event; and revising the description according to the comparing resulting in a revised description of the particular emergency event.

In one embodiment, the operations further comprise: generating a query according to the revised description of the particular emergency event.

In one embodiment, the operations further comprise: providing the query to the satellite that causes the satellite to provide the query to one or more other end user devices associated with the one or more other emergency communications.

In one embodiment, the determining the legitimacy of the emergency communication is based in part on a machine learning model being applied to one or more factors including a history of emergency communications associated with the end user device, a location of the end user device, a location of an emergency event associated with the emergency communication, a number of other emergency communications from other end user devices that are associated with the emergency event, a time period of the other emergency communications, locations of the other end user devices, or a combination thereof, and wherein the machine learning model is trained on historical emergency events, historical denial of service attacks, historical suspicious calls, or a combination thereof.

In one embodiment, a method comprises: receiving, by a processing system including a processor via a satellite, an emergency communication that was transmitted from an end user device to the satellite; and determining, by the processing system, a legitimacy of the emergency communication according to an analysis based on a history of emergency communications associated with the end user device, a location of the end user device, a location of an emergency event associated with the emergency communication, a number of other emergency communications from other end user devices that are associated with the emergency event, a time period of the other emergency communications, locations of the other end user devices, or a combination thereof.

In one embodiment, the method comprises: characterizing, by the processing system, the emergency communications as suspicious when the legitimacy of the emergency communication is determined to be below a threshold based on the analysis; and responsive to the suspicious characterization, adjusting a priority of the emergency communication to be lower than another priority of another emergency communication that has been characterized as non-suspicious for another emergency event.

In one embodiment, the method comprises: providing, by the processing system, a diligence request to the satellite that causes the satellite to request verification information from the end user device via an application programming interface with the end user device; receiving, by the processing system, the verification information from the satellite; and analyzing, by the processing system, the verification information, wherein the analysis for the legitimacy of the emergency communication is based in part on the verification information.

In one embodiment, the determining the legitimacy of the emergency communication is based on a machine learning model that is trained on historical emergency events, historical denial of service attacks, historical suspicious calls, or a combination thereof.

In one embodiment, the end user device does not have terrestrial wireless communication services available, and the method further includes: comparing, by the processing system, a description of the emergency event in the emergency communication with a stored description of the emergency event generated from the other emergency communications corresponding to the emergency event; revising, by the processing system, the description according to the comparing resulting in a revised description of the particular emergency event; generating, by the processing system, a query according to the revised description of the emergency event; and providing, by the processing system, the query to the satellite that causes the satellite to provide the query to the other end user devices.

In one embodiment, a non-transitory machine-readable medium, comprising executable instructions that, when executed by a processing system including a processor, facilitate performance of operations, the operations comprising: receiving, via a satellite, an emergency communication that was transmitted from an end user device to the satellite; determining, by the processing system, a legitimacy of the emergency communication resulting in a determined legitimacy; and responsive to the emergency communications being determined to be suspicious according to the determined legitimacy, adjusting a priority of the emergency communication to be lower than another priority of another emergency communication that has been characterized as non-suspicious for another emergency event.

In one embodiment, the determining the legitimacy of the emergency communication is based in part on a machine learning model being applied to one or more factors including a history of emergency communications associated with the end user device, a location of the end user device, a location of an emergency event associated with the emergency communication, a number of other emergency communications from other end user devices that are associated with the emergency event, a time period of the other emergency communications, locations of the other end user devices, or a combination thereof, and where the machine learning model is trained on historical emergency events, historical denial of service attacks, historical suspicious calls, or a combination thereof.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of system 100, the subsystems and functions of system 200, and method 230 presented in FIGS. 1, 2A, 2B, 2C, and 3.

For example, virtualized communication network 300 can facilitate in whole or in part analyzing emergency communications that were transmitted from end user devices; determining that a group of the emergency communications that corresponds to a group of the end user devices is associated with an emergency event; extracting descriptions of the emergency event from the group of the emergency communications; retrieving mapping data of a location associated with the emergency event; and generating a graphical representation of the emergency event based on a machine learning model being applied to the mapping data and the descriptions, where the machine learning model is trained on historical emergency events.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it is elastic: so, the resources are only consumed when needed. In a similar fashion, other network elements such as other routers, switches, edge caches, and middle boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements do not typically need to forward large amounts of traffic, their workload can be distributed across a number of servers—each of which adds a portion of the capability, and which creates an elastic function with higher availability overall than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

Figure 4:
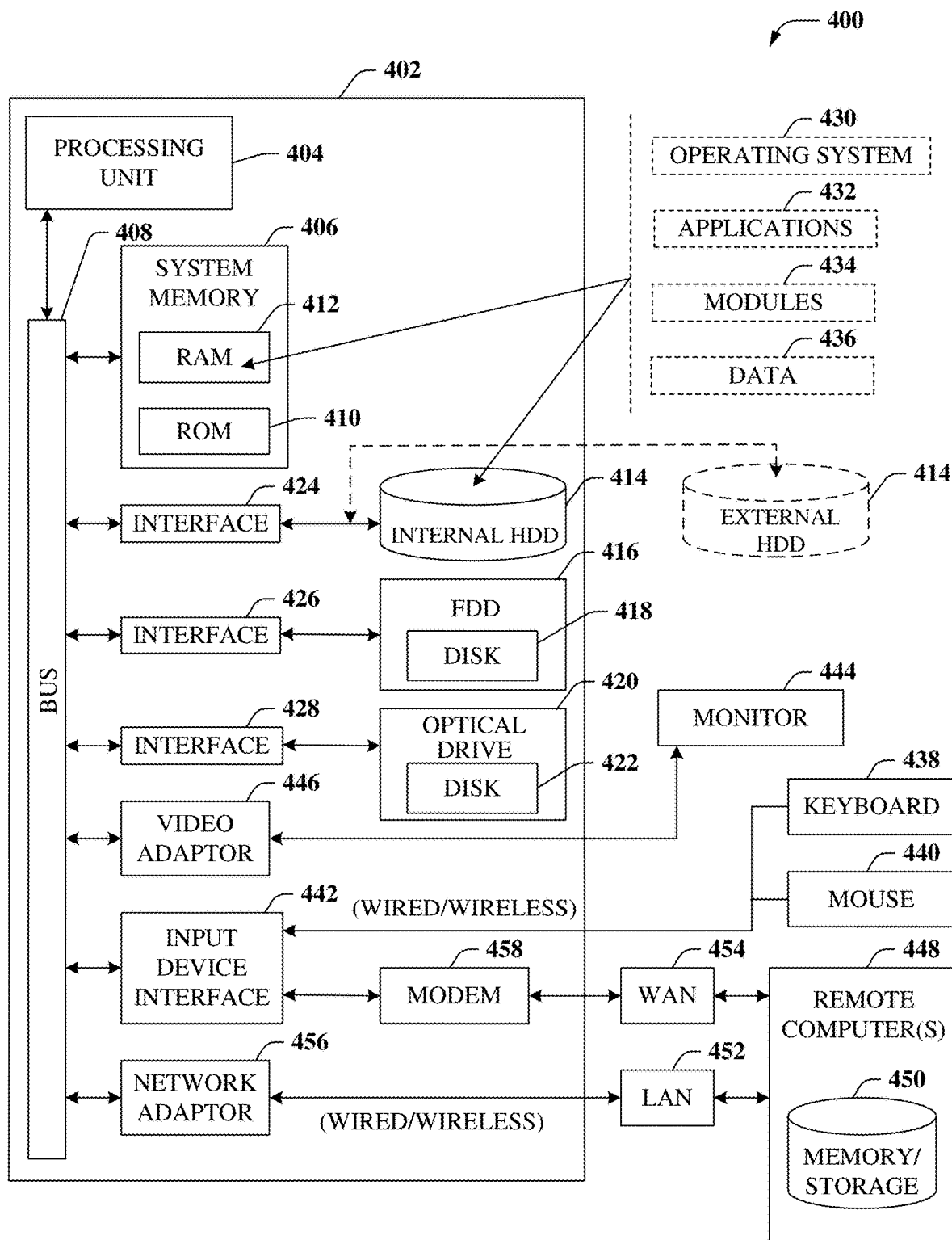
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part analyzing emergency communications that were transmitted from end user devices; determining that a group of the emergency communications that corresponds to a group of the end user devices is associated with an emergency event; extracting descriptions of the emergency event from the group of the emergency communications; retrieving mapping data of a location associated with the emergency event; and generating a graphical representation of the emergency event based on a machine learning model being applied to the mapping data and the descriptions, where the machine learning model is trained on historical emergency events.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high-capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
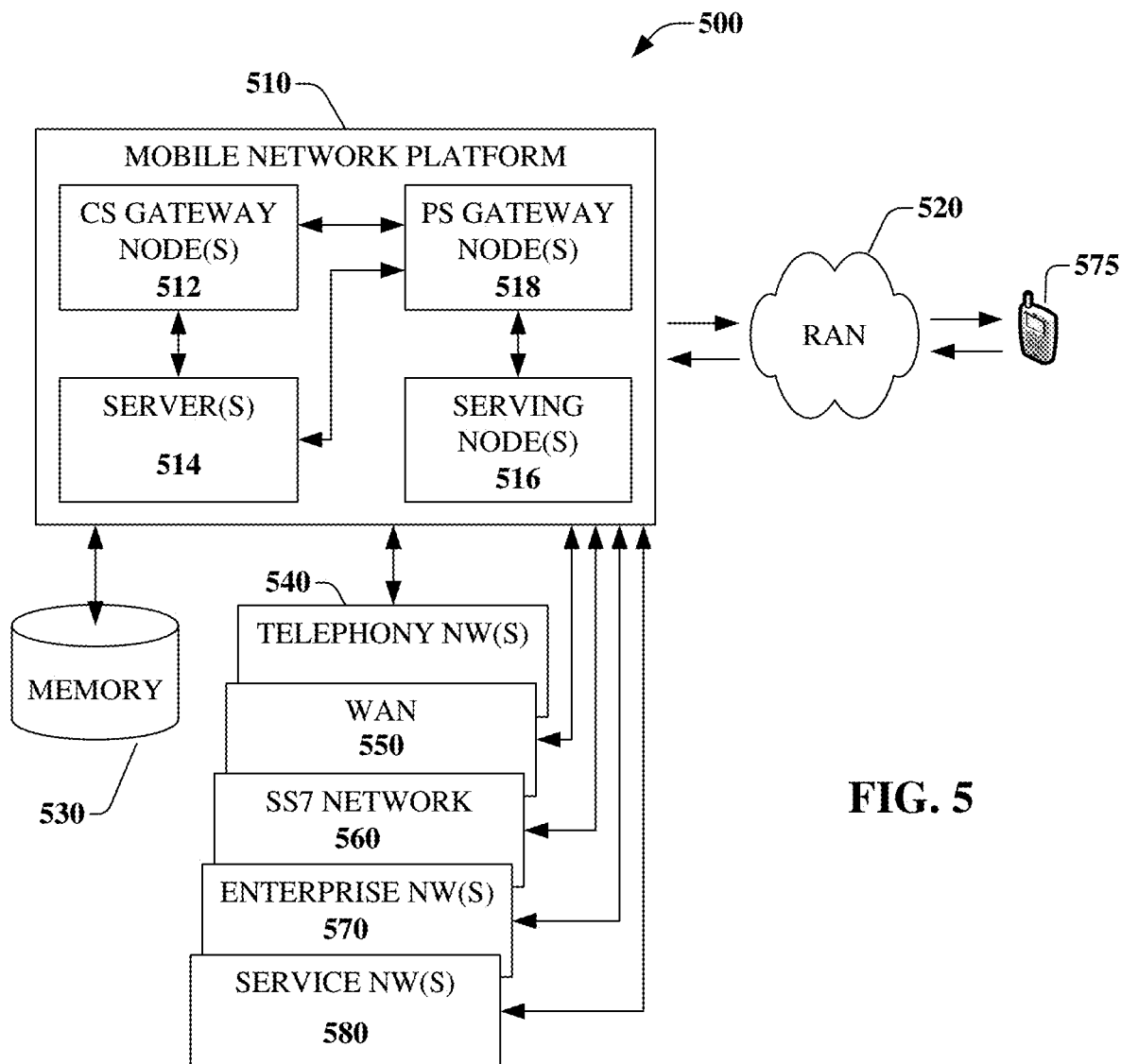
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part analyzing emergency communications that were transmitted from end user devices; determining that a group of the emergency communications that corresponds to a group of the end user devices is associated with an emergency event; extracting descriptions of the emergency event from the group of the emergency communications; retrieving mapping data of a location associated with the emergency event; and generating a graphical representation of the emergency event based on a machine learning model being applied to the mapping data and the descriptions, where the machine learning model is trained on historical emergency events. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
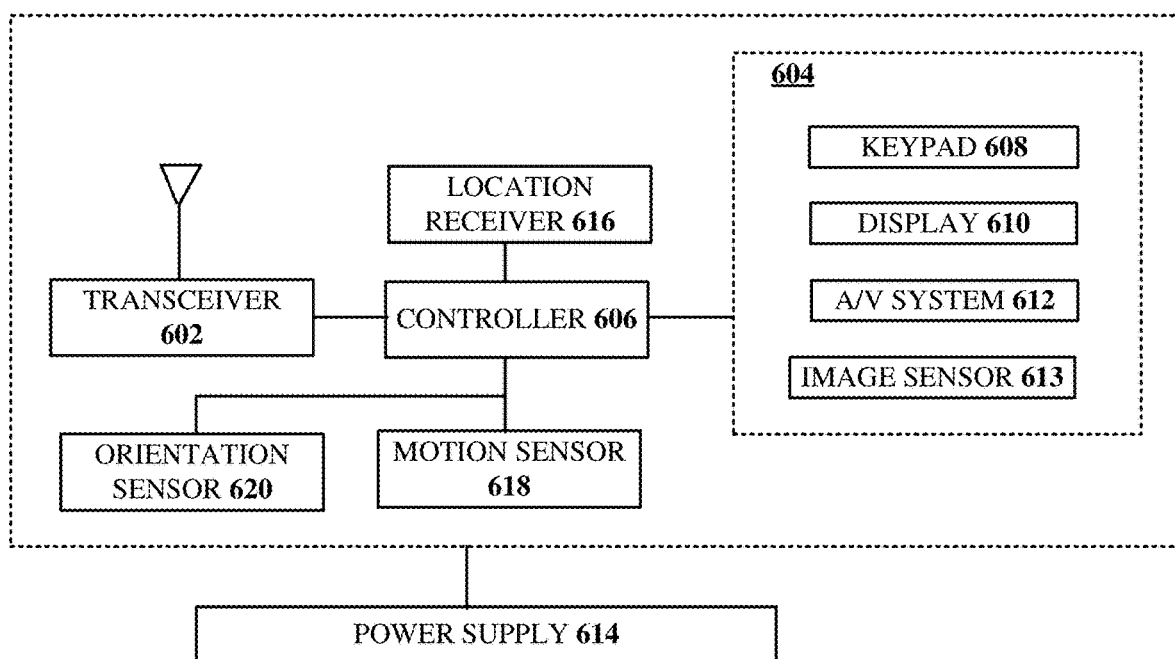
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part analyzing emergency communications that were transmitted from end user devices; determining that a group of the emergency communications that corresponds to a group of the end user devices is associated with an emergency event; extracting descriptions of the emergency event from the group of the emergency communications; retrieving mapping data of a location associated with the emergency event; and generating a graphical representation of the emergency event based on a machine learning model being applied to the mapping data and the descriptions, where the machine learning model is trained on historical emergency events.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x_1, x_2, x_3, x_4 \ldots x_n)$, to a confidence that the input belongs to a class, that is, $f(x)$ =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
a processing system including a processor; and
a memory that stores executable instructions that, when executed by the processing system, facilitate performance of operations, the operations comprising:
analyzing a group of emergency communications that were transmitted from a group of end user devices;
querying a location information server to determine a location that is common to the group of the end user devices;
determining that the group of the emergency communications that corresponds to the group of the end user devices is associated with a particular emergency event;
extracting descriptions of the particular emergency event from the group of the emergency communications;
retrieving mapping data of the location, wherein the mapping data include one or more types of information to be utilized to indicate a representation of the location; and
generating a graphical representation of the particular emergency event according to the mapping data and the descriptions, wherein the generating of the graphical representation of the particular emergency event comprises:
depicting the particular emergency event at different time periods during pendency of the particular emergency event, including past, present and future time periods; and
distinguishing the graphical representation of the particular emergency event at different time periods using time stamps.

2. The device of claim 1, wherein one or more of the group of the emergency communications is obtained via a satellite and are text messages, wherein one or more of the group of the end user devices that generated the text messages do not have terrestrial wireless communication services available.

3. The device of claim 1, wherein the analyzing the emergency communications comprises:
determining a legitimacy of at least a portion of the emergency communications based in part on a machine learning model being applied to one or more factors including a history of emergency communications associated with the corresponding end user devices, locations of the corresponding end user devices, locations of emergency events associated with the emergency communications, a number of the emergency communications, a time period of the emergency communications, locations of the corresponding end user devices, or a combination thereof, and wherein the machine learning model is trained on historical emergency events, historical denial of service attacks, historical suspicious calls, or a combination thereof.

4. The device of claim 3, wherein the generating the graphical representation of the particular emergency event comprises:
determining objects present at the particular emergency event according to an aggregation of the descriptions of the particular emergency event from the group of the emergency communications;
determining a confidence level for each of the objects;
providing the objects in the graphical representation of the particular emergency event; and
providing an indicia for each confidence level for each object in the graphical representation.

5. The device of claim 4, wherein the indicia is a color coding.

6. The device of claim 4, wherein the determining the confidence level is based on the determined legitimacy of the at least a portion of the emergency communications.

7. The device of claim 4, wherein the objects include emergency responders.

8. The device of claim 4, wherein the objects include a person of interest in a criminal investigation.

9. The device of claim 1, wherein the graphical representation includes a three-dimensional image.

10. The device of claim 1, wherein the operations further comprise:
predicting a future event associated with the particular emergency event based in part on a machine learning model being applied to the mapping data and the descriptions, and wherein the machine learning model is trained on historical emergency events.

11. The device of claim 1, wherein the operations further comprise:
analyzing the graphical representation of the particular emergency event to identify regions that are unaccounted for in the descriptions of the particular emergency event from the group of the emergency communications;
generating a query according to the unaccounted for regions requesting a further description; and
providing the query to at least one of the group of the end user devices.

12. The device of claim 11, wherein the providing the query comprises providing the query to a satellite that causes the satellite to provide the query to the at least one of the group of the end user devices.

13. The device of claim 1, wherein the graphical representation is a video reconstructing at least a portion of the particular emergency event.

14. A method comprising:
analyzing, by a processing system including a processor of a network device, a first emergency communication that was transmitted from a first end user device over a Citizens Broad Band Radio Service (CBRS) spectrum via a CBRS access point of a private network, the first emergency communication being associated with an emergency event;
providing, by the processing system, a query to the CBRS access point to obtain information regarding the private network including a number of second end user devices attached to the private network and a signal strength for each of the second end user devices;
determining, by the processing system, locations for each of the second end user devices;
extracting, by the processing system, a description of the emergency event from the first emergency communication;

retrieving, by the processing system, mapping data for a location of the emergency event; and generating, by the processing system, a graphical representation of the emergency event according to the mapping data, the description and the locations for each of the second end user devices, wherein the generating of the graphical representation of the emergency event comprises:

depicting the emergency event at different time periods during pendency of the emergency event, including past, present and future time periods; and distinguishing the graphical representation of the emergency event at different time periods using time stamps.

15. The method of claim 14, wherein objects are represented in the graphical representation at the locations for each of the second end user devices.

16. The method of claim 14, comprising:

determining, by the processing system, that a group of emergency communications that corresponds to a group of end user devices is associated with the emergency event; and extracting, by the processing system, descriptions of the emergency event from the group of the emergency communications, wherein the graphical representation is generated based in part on the descriptions.

17. The method of claim 16, wherein a first end user device of the group of end user devices transmitted the corresponding one of the group of the emergency communications over a cellular network that is distinct from the private network.

18. The method of claim 16, wherein a first end user device of the group of end user devices transmitted the corresponding one of the group of the emergency communications via a satellite service when terrestrial wireless communications services were unavailable to the first end user device.

19. A non-transitory machine-readable medium, comprising executable instructions that, when executed by a processing system including a processor, facilitate performance of operations, the operations comprising:

analyzing emergency communications that were transmitted from end user devices;

determining that a group of the emergency communications that corresponds to a group of the end user devices is associated with an emergency event;

extracting descriptions of the emergency event from the group of the emergency communications;

retrieving mapping data of a location associated with the emergency event; and generating a graphical representation of the emergency event based on a machine learning model being applied to the mapping data and the descriptions, wherein the machine learning model is trained on historical emergency events, and wherein the generating of the graphical representation of the emergency event comprises: depicting the emergency event at different time periods during pendency of the emergency event, including past, present and future time periods; and distinguishing the graphical representation of the emergency event at different time periods using time stamps.

20. The non-transitory machine-readable medium of claim 19, wherein the generating the graphical representation of the emergency event comprises:

determining objects present at the emergency event according to an aggregation of the descriptions of the emergency event from the group of the emergency communications;

determining a confidence level for each of the objects; and providing the objects in the graphical representation of the emergency event according to the confidence level.

* * * * *